Patented June 10, 1930

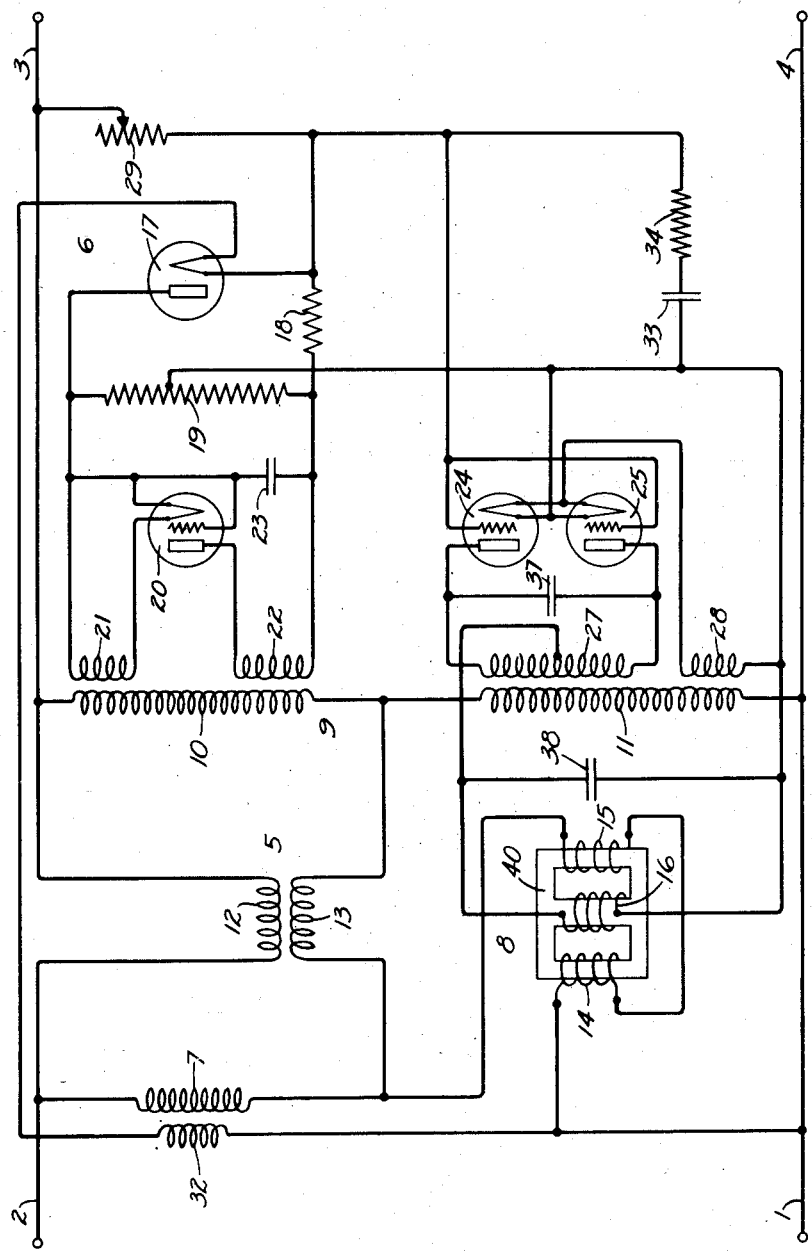

1,763,017

UNITED STATES PATENT OFFICE

HUGH M. STOLLER, OF MOUNTAIN LAKES, NEW JERSEY, ASSIGNOR TO BELL TELEPHONE LABORATORIES, INCORPORATED, OF NEW YORK, N. Y., A CORPORATION OF NEW YORK

REGULATOR SYSTEM

Application filed June 15, 1928. Serial No. 285,768.

This invention relates to regulator systems and particularly to voltage regulator systems employing electric space discharge tubes for maintaining a constant potential on load circuits.

One object of the invention is to provide an improved regulator system that shall maintain a characteristic of a load circuit constant.

Another object of the invention is to provide a regulator system having a two-element space discharge regulator tube that shall compensate for the change in the regulating system required to operate the regulator tube to improve the precision of the regulating system.

A further object of the invention is to provide a regulator system having a Wheatstone bridge circuit therein that shall inductively govern one arm of the Wheatstone bridge circuit in an improved manner for controlling a load circuit to maintain the voltage thereon constant.

In many cases it is desirable to have a particular load circuit maintained at constant potential with greater precision than is ordinarily required. It would be unnecessarily troublesome and expensive to regulate the generator supplying current to the load circuit inasmuch as this load circuit may be only a small part of the output of the generator. The regulator for the load circuit would ordinarily be of very small power rating as compared with a regulator for a generator supplying power to a number of load circuits.

The voltage regulator hereinafter disclosed may be applied to a load circuit and maintain the voltage thereof substantially constant independently of the voltage conditions of the generator supplying current to the load circuit. In the preferred embodiment to be described hereinafter, the load circuit is connected to a supply circuit and a regulating transformer has the secondary winding thereof in series between one side of the supply circuit and load circuit. The primary winding of the regulating transformer is joined to opposite vertices of an inductance Wheatstone bridge circuit connected across the supply and load circuits. Two arms of the Wheatstone bridge circuit respectively comprise a fixed retardation coil and a variable retardation coil. The other two arms of the bridge circuit comprise a primary winding of a power transformer. The variable retardation coil forms a part of a reactor of the type disclosed in the patent to H. M. Stoller et al., No. 1,662,083 dated March 13, 1928. Two alternating current windings are mounted on a core with a direct current winding so that the impedance of the alternating current windings may be varied by varying the current in the direct current winding.

A two-element electric discharge device, which forms one arm of a resistance bridge circuit, has a filament connected across the load circuit to control the space current of the device in accordance with the voltage of the load circuit. The filament of the two-element space discharge device is also connected to a coil inductively connected to the fixed retardation coil of the inductance bridge circuit in order to compensate for the change in the load circuit voltage required to operate the regulating circuits. The input circuits of two amplifier tubes are connected across opposite vertices of the resistance bridge circuit and the output circuit of the amplifier tubes is connected to the direct current winding forming a part of the variable reactance in the impedance bridge circuit. Thus the two element electric discharge device is operated according to the voltage on the load circuit for controlling the inductance bridge circuit which in turn controls the regulating transformer connected to the supply and load circuits. The regulating transformer is so connected to the supply and load circuits as to correct for voltage changes on the load circuit.

The single figure in the accompanying drawing is a diagrammatic view of a regulator system constructed in accordance with the invention.

Referring to the drawing, a supply circuit comprising conductors 1 and 2 is connected to a suitable source of supply not shown. A load circuit comprising conductors 3 and 4 is connected to the supply circuit and a regulator, constructed in accordance with the invention, is provided for maintaining substantially constant voltage across the load conductors. The regulator comprises an inductance Wheatstone bridge circuit 5 under the control of a resistance Wheatstone bridge circuit 6. The inductance bridge circuit comprises a fixed retardation coil 7, a variable inductance 8 and the primary winding of a transformer 9. The primary winding of the transformer 9 is divided into sections 10 and 11 which form arms of the inductance Wheatstone bridge circuit. A regulating transformer has the secondary winding 12 thereof connected in series with the supply conductor 2 and the primary winding 13 thereof connected between two opposite vertices of the inductance Wheatstone bridge circuit 5.

The variable inductance device 8 is preferably constructed similar to the inductance reactor disclosed in the patent to H. M. Stoller et al., No. 1,662,083, dated March 13, 1928. Two alternating current windings 14 and 15 and a direct current winding 16 are mounted on a core member 40. The alternating current windings 14 and 15 form one arm of the inductance Wheatstone bridge circuit 5 and are controlled in accordance with the direct current flowing through the direct current winding 16. An increase in the current flow through the direct current winding 16 serves to decrease the impedance of the variable inductance device.

The resistance Wheatstone bridge circuit which controls the current flowing through the direct current winding 16 of the variable inductance device is operated in accordance with the voltage obtained across the load conductors 3 and 4. The Wheatstone bridge circuit 6 comprises a two-element thermionic tube 17, a resistance element 18 and a resistance element 19. The resistance element 19 forms two arms, the thermionic tube 17 forms a third arm and the resistance element 18 forms a fourth arm of the Wheatstone bridge circuit. A thermionic rectifier tube 20 is provided for supplying rectified current from the transformer 9 to the bridge circuit 6. A secondary winding 21 is provided for supplying heating current to the filament of the rectifier 20 and a secondary winding 22 is provided for supplying plate current to the rectifier. A condenser 23 is connected across the output circuit of the rectifier to smooth out any ripples in the rectified current. The potential supplied by the rectifier 20 is made sufficiently high so that an excess of voltage is impressed on the plate of the tube 17 at all times. It is necessary to maintain an excess voltage on the plate of the tube 17 to render the space current of the tube independent of the rectifier characteristics and solely dependent on the filament emission of the tube 17.

Two thermionic amplifier tubes 24 and 25 have their input circuits connected in parallel across two opposite vertices of the resistance Wheatstone bridge circuit 6. The output circuits of the amplifier tubes 24 and 25 are connected in parallel to the direct current winding 16, of the variable inductance 8. The two amplifier tubes are supplied with plate and filament current from the transformer 9 by means of secondary windings 27 and 28.

The filament of the two-element thermionic tube 17 is connected across the load circuit in series with a resistance element 29 and the compensating winding 32 of the fixed retardation coil 7. The filament of the thermionic tube 17 is heated in accordance with the voltage on the load circuit. Inasmuch as the tube 17 forms one arm of the resistance Wheatstone bridge circuit 6, it is apparent that any change in the voltage across the load conductors 3 and 4 serves to vary the temperature of the filament in the tube 17 and accordingly to vary the resistance of the tube 17. The two amplifier tubes 24 and 25 which are connected across opposite vertices of the bridge circuit 6 are accordingly controlled in accordance with the voltage on the load conductors 3 and 4 for controlling the current in the direct current winding 16. Normally, the Wheatstone bridge circuit 6 is unbalanced sufficiently to maintain a negative potential on the grids of the two amplifier tubes 24 and 25.

If the voltage across the load conductors 3 and 4 rises above normal value the temperature of the filament in the tube 17 is raised to increase the space current flow through the tube. The increase in the space current flow through the tube 17 unbalances the Wheatstone bridge circuit 6 to decrease the negative potential impressed on the grids of the two amplifier tubes 24 and 25. Decreasing the negative potential on the grids of the two amplifier tubes increases the space current in such tubes and accordingly increases the current flow through the direct current winding 16 of the variable reactance 8. An increase in the current flow through the direct current winding 16 serves to decrease the impedance in the variable reactance 8 and accordingly to increase the current flow through the windings 14 and 15. The reduction in impedance of the variable inductance 8 unbalances the inductance Wheatstone bridge circuit 5 and causes current to flow through the regulating transformer. The regulator transformer comprising windings 12 and 13 is assumed to be so connected to the Wheatstone bridge circuit and the supply circuit as to impress a potential on the supply circuit tending to lower the load circuit voltage when the Wheatstone bridge circuit 5 is unbalanced by lowering the impedance of the variable inductance 8. The secondary winding 12 of the regulator transformer opposes the voltage across the supply conductors to lower the voltage impressed on the load conductors 3 and 4.

The filament of the two-element thermionic tube 17 in the resistance Wheatstone bridge circuit 6 is connected across the load conductors in series with a winding 32. The winding 32 is coupled to the fixed inductance 7 in the inductance Wheatstone bridge circuit 5 and serves to impress a potential on the filament of the thermionic tube 17 to compensate for the change of filament current required to produce the changed space current for regulation purposes. It is well known that an increase of five per cent in the filament current of a thermionic tube having a tungsten filament will produce an increase of substantially one hundred per cent in the space current. Thus, if no compensating means were provided some slight change in the load circuit voltage would be required to operate the regulating circuits. If the impedance of the variable inductance 8 is decreased to unbalance the inductance Wheatstone bridge circuit 5, it will be noted that an increased current flow is effected through the inductance 7. The change in current flow through the fixed inductance 7 raises the potential impressed on the winding 32 and accordingly raises the temperature of the filament in the thermionic tube 17. This compensating effect on the filament of the thermionic tube 17 may be adjusted so as to obtain flat regulation. The feed-back operation on the filament of the thermionic tube does not cause hunting action because the complete operation is slowed up by the high inductance of the direct current winding 16 in the variable inductance device 8.

A filter comprising a condenser 33 and resistance element 34 is connected across the input circuits of the two thermionic amplifiers 24 and 25. Such filter serves to smooth out the ripples which otherwise would be present in the potential impressed on the grids of the amplifier tubes. It is desirable to smooth out the ripples of the potential impressed on the grids, inasmuch as such ripples would not be in phase with the potential impressed on the plates of the amplifier tubes from the output transformer 9. The lag in the potential impressed on the grids of the amplifier tubes is due to heating effects in the filament of the two-element thermionic tube 17. Unless the ripples in the potential impressed on the grids of the thermionic amplifier are filtered out, the grid and plate potentials of the amplifier tubes will be out of phase. The capacity 33 alone will not serve as a filter in the input circuits of the amplifier tubes inasmuch as an oscillation is liable to be set up and cause the regulator to hunt. In order to prevent such oscillation, the resistance element 34 is connected in series with the condenser 33.

A condenser 37 is connected across the plates of the two amplifier tubes 24 and 25 in order to cause a steady leading current to be drawn by the power transformer 9 and thus reduce the effect of load fluctuation. The condenser 37 also serves to improve the power factor of the system and to by-pass some of the harmonics of the amplifier circuit. A condenser 38 is connected across the direct current winding 16 of the variable inductance 8 in order to smooth out ripples in the current supplied to the winding.

In case the voltage across the load conductors 3 and 4 falls below normal value, the temperature of the filament of thermionic tube 17 is lowered to increase the negative potential on the grids of the amplifier tubes 24 and 25. This lowers the output of the amplifier tubes and accordingly lowers the current flow through the direct current winding 16 of the variable inductance 8. The variable inductance 8 unbalances the inductance Wheatstone bridge circuit 5 to cause the regulator transformer to increase the voltage supplied to the load circuits 3 and 4. The coil 32, which is coupled to the fixed inductance 7, operates on the thermionic tube 17 to effect a compensating action to correct for the change in voltage on the load circuit.

Modifications in the system and in the arrangement and location of parts may be made within the spirit and scope of the invention, and such modifications are intended to be covered by the appended claims.

What is claimed is:

1. In a regulator system, a load circuit, a supply circuit connected to said load circuit, control circuits comprising an electric discharge device operated according to the voltage on said load circuit, and means comprising a Wheatstone bridge circuit governed by said control circuits for maintaining the voltage on said load circuit substantially constant.

2. In a regulator system, a load circuit, a supply circuit connected to said load circuit, a Wheatstone bridge circuit, means comprising a two-element electric discharge device for controlling the bridge circuit in accordance with the voltage on said load circuit, and means controlled by said bridge circuit for maintaining the voltage on said load circuit substantially constant.

3. In a regulator system, a load circuit, a supply circuit for said load circuit, a Wheatstone bridge circuit including a regulator transformer connected across opposite vertices thereof for controlling the load circuit voltage, and means comprising a space discharge device for controlling said bridge circuit to maintain the load circuit voltage substantially constant.

4. In a regulator system, a load circuit, a supply circuit connected to said load circuit, an inductance Wheatstone bridge circuit, means comprising an electric discharge device for controlling one arm of said bridge circuit in accordance with the voltage on the load circuit, and means controlled by the bridge circuit for maintaining constant voltage on the load circuit.

5. In a regulator system, a load circuit, a supply circuit for said load circuit, an inductance Wheatstone bridge circuit connected to said load circuit, one arm of said bridge circuit comprising alternating current windings on a core with a direct current control winding, means governed by said bridge circuit for controlling the voltage on said load circuit, and means comprising an electric discharge device operated according to the load circuit voltage for varying the energization of said direct current winding to control the bridge circuit and maintain the load circuit voltage substantially constant.

6. In a regulator system, a load circuit, a supply circuit, a regulator transformer having a secondary winding connected between said circuits for controlling the voltage on the load circuit, an inductance Wheatstone bridge circuit connected across said supply and load circuits, the primary winding of said regulator transformer being connected between two opposite vertices of said bridge circuit, and means for automatically controlling the inductive impedance of one arm of said bridge circuit to maintain the voltage on said load circuit substantially constant.

7. In a regulator system, a load circuit, a supply circuit, a stationary coil for connecting the supply circuit to said load circuit, a two-element electric discharge device having the filament thereof connected across said load circuit for controlling the space current of the device in accordance with the potential on the load circuit, means for varying the filament heating current to compensate for the filament current required to effect the regulating action, and means controlled by said electric discharge device for controlling said coil to maintain the load circuit voltage substantially constant.

8. In a regulator system, a load circuit, a supply circuit connected to said load circuit, means comprising an inductance Wheatstone bridge circuit connected across said circuits for controlling the voltage on the load circuit, a two-element electric discharge device having the filament thereof connected across said load circuit for controlling the space current of the device in accordance with the potential on the load circuit, means comprising a coil inductively connected to one arm of said bridge circuit for varying the filament heating current to compensate for the filament current required to effect the regulating action, and means for controlling said bridge circuit in accordance with the space current of said device to maintain the load circuit voltage substantially constant.

9. In a regulator system, a load circuit, a supply circuit connected to the load circuit, a two-element electric discharge device having the filament thereof connected across said load circuit, a resistance Wheatstone bridge circuit having said discharge device as one arm thereof, and means comprising control circuits connected to opposite vertices of said bridge circuit for maintaining the voltage on said load circuit substantially constant.

10. In a regulator system, a load circuit, a supply circuit connected to the load circuit, a resistance Wheatstone bridge circuit including a two-element electric discharge device having the filament thereof connected across said load circuit, and means comprising an inductance Wheatstone bridge circuit controlled by said resistance bridge circuit for maintaining the voltage on said load circuit substantially constant.

11. In a regulator system, a load circuit, a supply circuit connected to said load circuit, a regulator transformer having a primary winding thereof connected in series with one side of said circuits, an inductance Wheatstone bridge circuit having two arms connected across the supply circuit and two arms connected across the load circuit, a primary winding for said regulator transformer connected to two opposite vertices of said bridge circuit, one arm of said bridge comprising alternating current windings mounted on a core member with a direct current winding, a two-element electric discharge device having the cathode thereof connected across the load circuit to be heated in accordance with the voltage on the load circuit, two three-element electric discharge tubes having their input circuits energized according to the space current flowing through said two-element tube, windings inductively connected to two arms of said bridge circuit for supplying space current to said three-element tubes, and means for connecting the output circuit of said three-element tubes to said direct current winding to control said bridge circuit and maintain a constant voltage on the load circuit.

12. In a regulator system, a load circuit, a supply circuit, a stationary coil for connecting the supply circuit to said load circuit, means comprising an electric space discharge device for controlling said coil to maintain the voltage across the load circuit substantially constant irrespective of the voltage across the supply circuit, and means operating according to the regulating operation for compensating the operation of said device.

13. In a regulator system, a load circuit, a supply circuit for said load circuit, a transformer connected between the load circuit and the supply circuit, regulator means for controlling said transformer to maintain the voltage across the load circuit substantially constant, said means comprising an electric space discharge device operated according to the voltage across the load circuit, and means for varying the operation of said device to compensate for the regulating operation.

In witness whereof, I hereunto subscribe my name this 13th day of June, 1928.

HUGH M. STOLLER.